ns the description as description proceeds.

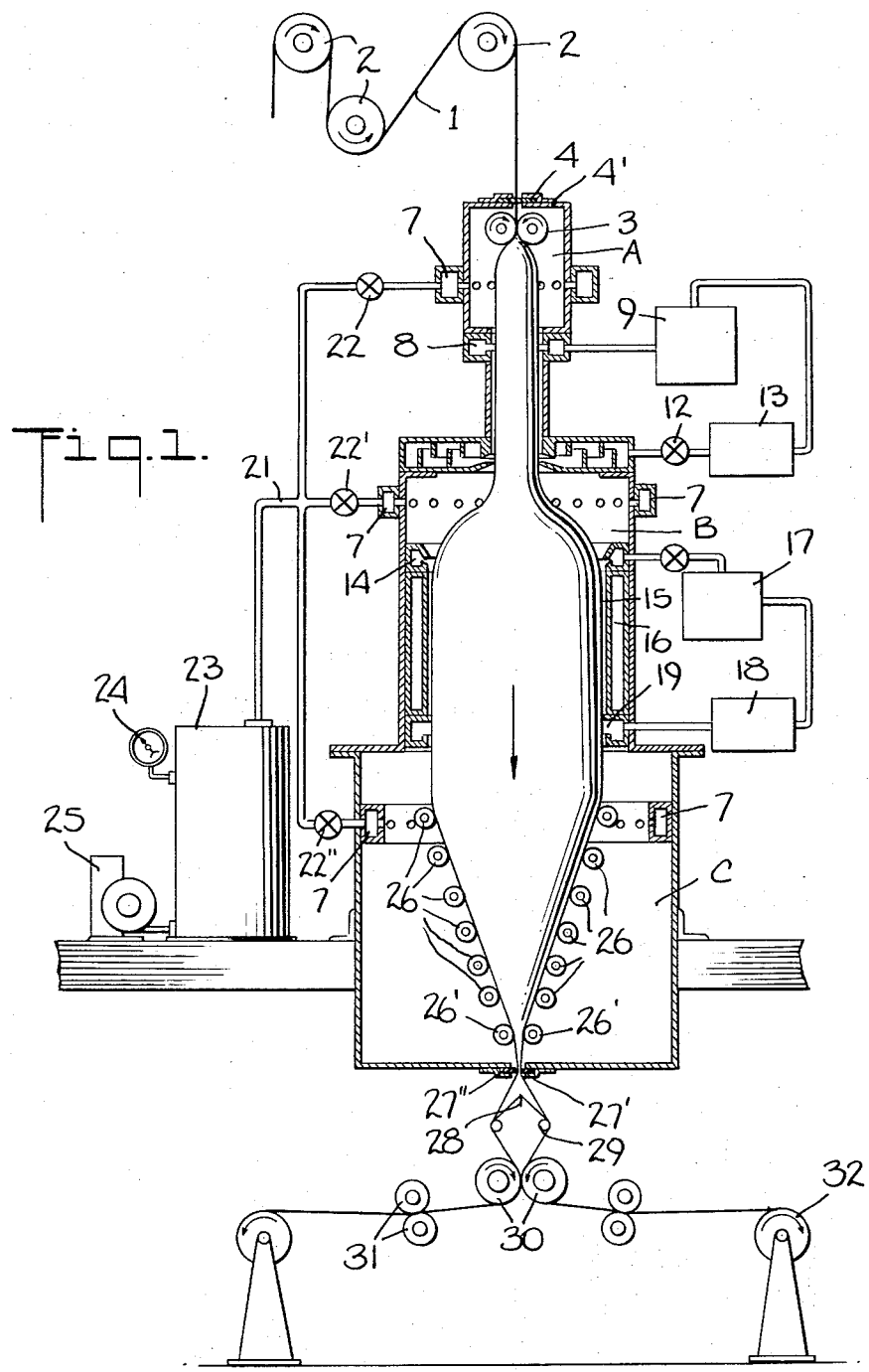

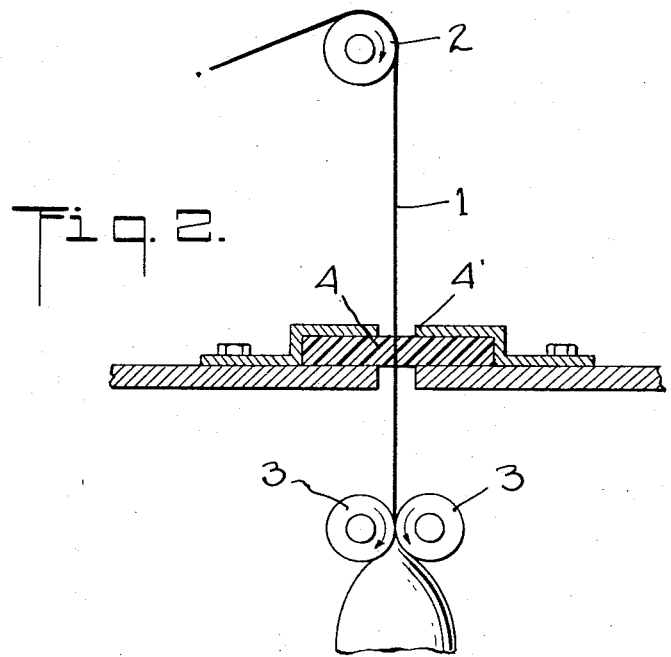
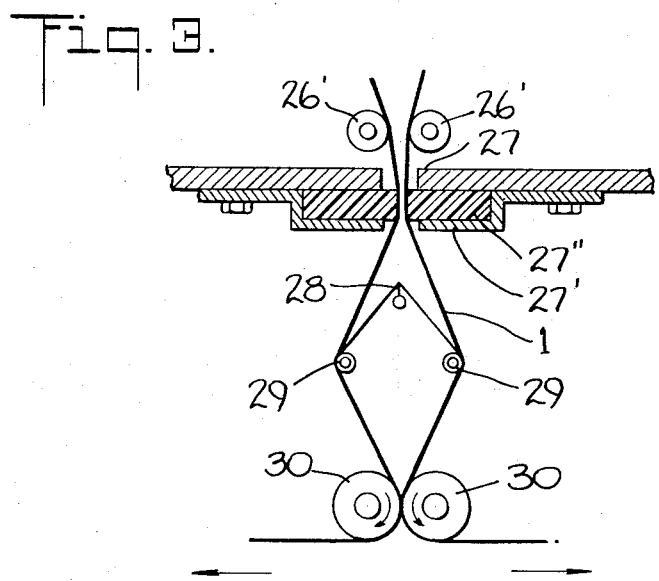

United States Patent Office 3,363,035
Patented Jan. 9, 1968

3,363,035
PROCESS FOR STRETCHING TUBULAR MOLDED ARTICLES OF THERMOPLASTIC RESIN
Minoru Niiho, Hirakata-shi, Hiroshi Ueda, Osaka-shi, Tetsuji Tokui, Moriguchi-shi, Jun-ichi Nakajima, Tobushi, and Michio Hamada, Mishima-gun, Osaka-fu, Japan, assignors to Sekisui Kagaku Kogyo Kabushikikaisha, Osaka, Japan, a corporation of Japan
Filed Dec. 16, 1964, Ser. No. 418,747
19 Claims. (Cl. 264—89)

ABSTRACT OF THE DISCLOSURE

A method and apparatus for stretching tubular molded articles of thermal plastic resin wherein the exterior of the article is subjected to subatmospheric pressure during heating, stretching, cooling and flattening.

---

This invention relates to stretching thermoplastic resin and more particularly to stretching tubular articles of thermoplastic resin. Heretofore, it was known to stretch thermoplastic film in both longitudinal and transverse directions by a flat film process which constituted holding both sides of a flat thermoplastic film by clips. However, such apparatus stretched the sides unequally and hence after stretching both sides of the thermoplastic film had to be cut off, thereby wasting raw material as well as necessitating the use of complictaed, expensive apparatus.

Another process used heretofore in the longitudinal and transverse stretching of plastic films is known as the tubular process which comprised holding the tubular thermoplastic film at two space points by means of pinch rollers and introducing gaseous pressure into the center of the thermoplastic film. This method required expensive and complicated apparatus and was not particularly satisfactory.

In essence the present invention contemplates the provision of a process for stretching tubular articles of thermoplastic resin comprising pressing said tubular article between a pair of pinch rollers disposed in a prevacuum chamber of subatmospheric pressure, heating said article to a temperature between its softening point and its melting point in a heating zone of subatmospheric pressure, and stretching the article simultaneously in longitudinal and transverse directions while subjecting the exterior thereof to a sub-atmospheric pressure. The process further comprises cooling the article to a temperature below the softening point of the resin while subjecting the exterior thereof to a sub-atmospheric pressure, and flattening the article while subjecting the exterior thereof to a sub-atmospheric pressure. The next steps of the process constitute longitudinally cutting the article while subjecting the exterior thereof to atmospheric pressure, and winding the article.

In another form thereof the present invention contemplates the provision of a new and improved apparatus for stretching tubular articles of thermoplastic resin comprising a first pair of pinch rollers disposed in a prevacuum chamber, a stretching vacuum chamber, and heating means and cooling means for said article disposed in said stretch vacuum chamber. A folding vacuum chamber is provided and means for folding the article into a flat shape are disposed in the folding chamber. Further, cutting means are provided for longitudinally cutting the article. A second pair of pinch rollers are located adjacent the cutting means and are operable at a speed in excess of the speed of the first pair of pinch rollers.

The invention has, as one of its features, a simplification of apparatus and methods heretofore deemed necessary for stretching tubular articles of thermoplastic resin of the character aforesaid, whereby apparatus components and manipulative operations are eliminated as compared to practices of the prior art.

Another feature of the present invention resides in the provision of a new and improved process for stretching tubular molded articles of thermoplastic resin by which the article is simultaneously stretched in a longitudinal and transverse direction in a greatly improved manner.

These and other advantages of the apparatus and method of the invention as compared to systems of stretching tubular molded articles of thermoplastic heretofore utilized will become apparent as the description proceeds.

Still another feature of the invention is to provide a novel method whereby film of excellent molecular orientation can be produced.

Another feature of the present invention resides in the provision of a new and improved process for stretching tubular articles of thermoplastic resin which may be used for stretching tubular molded articles of crystal thermoplastic resin, which provides an effective heat exchange means for heating and cooling the tubular article and with which thermal dimensional stability is achieved.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a vertical sectional view of apparatus for stretching a tubular article of thermoplastic resin constructed in accordance with the concept of this invention;

FIG. 2 is an enlarged vertical sectional view showing the entrance to the prevacuum chamber and the first pair of pinch rollers;

FIG. 3 is an enlarged vertical sectional view showing the bottom of the folding vacuum chamber, cutting apparatus and the second or stretching pinch rollers.

Figure 4:
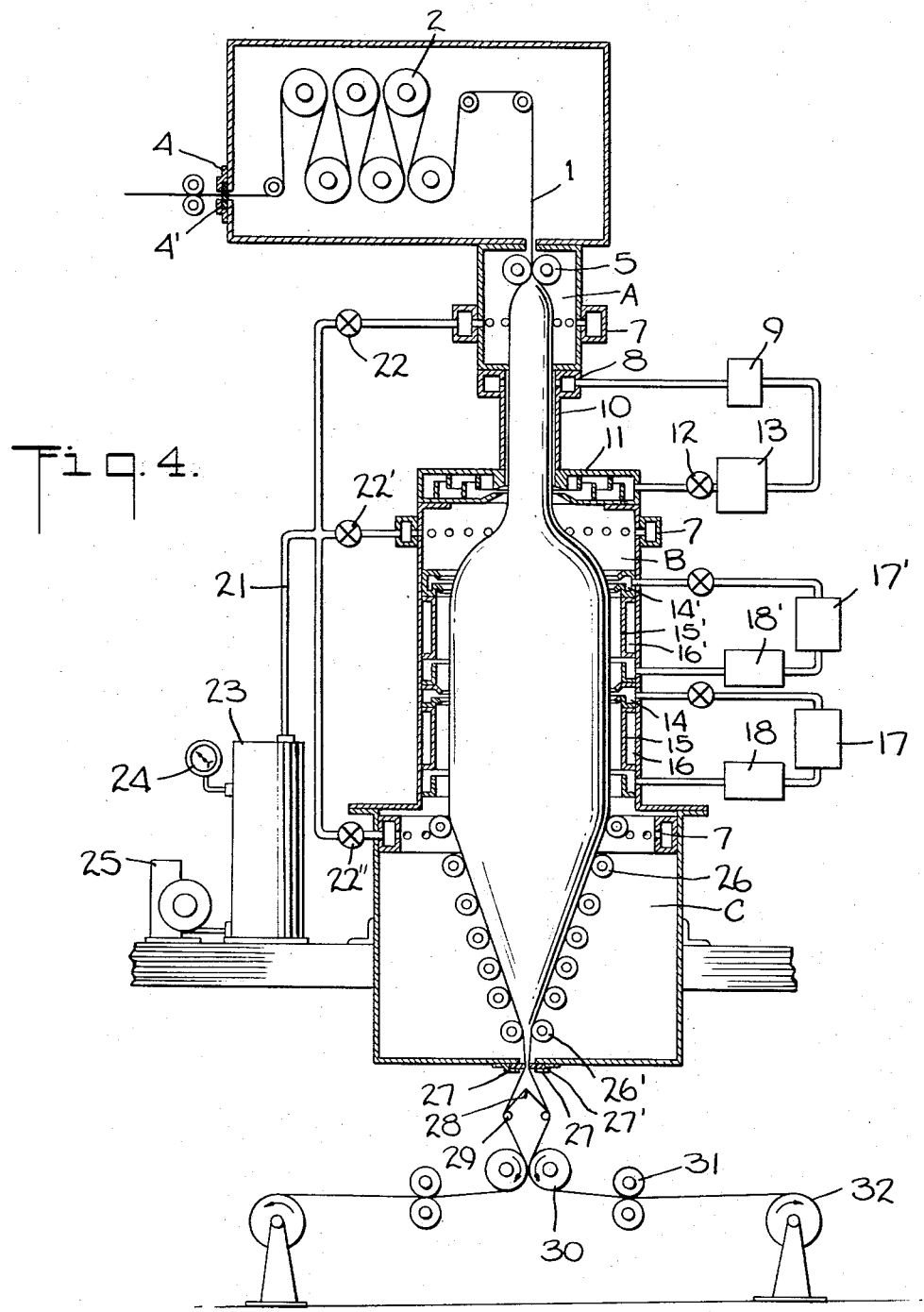
FIG. 4 is a vertical sectional view of another embodiment of apparatus for stretching a tubular article of thermoplastic resin according to the present invention.

In the embodiment of the invention illustrated in FIGS. 1–3 inc., the apparatus for stretching a tubular article of thermoplastic resin includes a plurality of heating rollers 2, which receive the tubular molded article of thermoplastic resin 1. As best seen in FIG. 2, a pair of pinch rollers 3 press and continuously transfer the article 1 to the vacuum chambers designated generally as prevacuum chamber A, stretching vacuum chamber B and folding vacuum chamber C. A pressure seal 4 retains the vacuum in the prevacuum chamber A at the inlet 4' thereof.

As best seen in FIG. 1, a vacuum is maintained in the chambers A, B and C by means of a vacuum pump 25 which is connected to a vacuum tank 23 having a pressure controller 24. Pipe 21 leads from the vacuum tank 23 to valves 22, 22', and 22" which are connected to exhaust opening 7 in the chambers A, B and C whereby the vacuum or subatmospheric pressure may be individually controlled for each chamber.

Still referring to FIG. 1, a heated passage 10 interconnects the prevacuum chamber A and the stretching vacuum chamber B. The heat is provided by means of a circular or ring-like nozzle 11 blowing hot air against the exterior of the tubular product 1. The hot air flows upwardly through the passage 10 between the inside wall of the passage and the outside wall of the tubular product to the exhaust opening 8, from whence it passes through the exhaust pump 9 to an air heater 13. Valve 12 controls the flow of hot air through the nozzle 1.

In the upper portion of the stretching vacuum chamber B, the heated thermoplastic article is subjected to increased vacuum and is caused to expand transversely due to the increased pressure differential between the pressure inside the tubular article and outside thereof. The stretching vacuum chamber B is provided with a circular or ring-like nozzle 14 which blows cold air around the circumference of the tubular article, to set or fix the article in its permanently stretched condition. The cool air passes downwardly through the cooling passage 15 until it reaches the exhaust opening 19, from whence the air is withdrawn and passes to the exhaust pump 18, thence to the cooler 17 and thereafter it returns through a valve to the nozzle 14. After passing through the stretching vacuum chamber B, the tubular article enters the folding vacuum chamber C.

A plurality of pairs of guide rollers 26 are disposed in the vacuum chamber C. These rollers are arranged so as to gradually narrow the tubular article until the last pair of guide rollers 26' are reached, as seen in FIG. 1. That is, the tubular shaped article is gradually folded into two flat sheets. It is noted that there is space between the guide rollers 26' in order to allow air to flow inside the tubular molded article.

As best seen in FIG. 3, vacuum is maintained in chamber C by means of a pressure sealer 27" made from a soft and elastic material such as sponge, for example. The sealer 27" is retained against the wall of the vacuum chamber C adjacent the discharge opening or slit 27 by means of bracket 27'.

The so flattened article exits from chamber C through the slit 27, through the sealer 27" and thence passes to a pair of opening rollers 29 disposed a short distance from the chamber C. The opening rollers 29 coact with a cutter 28 disposed therebetween in order to longitudinally sever the article into two elongated flat webs or sheets. Then the webs are lead to a pair of stretching pinch rollers 30 (FIGS. 1 and 3).

The second pair of rollers or stretching pinch rollers 30 are adapted to operate at a surface speed in excess of the first pair of pinch rollers 3 (FIG. 1), and thereby longitudinally stretch the heated tubular molded article 1 while it passes through the stretching vacuum chamber B as will be discussed more fully hereinafter.

As seen in FIG. 1, pinch rollers 31 and winding apparatus 32 receive the so cut web material from the pinch rollers 30 and wind same up into rolls.

In operation, an article 1 which may be in elongated tubular molded form or which may be a continuous tubular article is made from a thermoplastic resin.

The article in its folded flat condition is preheated by passing over the heating rollers 2 (FIG. 1). It is desirable that the preheating temperature is as near the softening temperature of the resin as is possible, but it is necessary that the preheating temperature is below the temperature at which the tubular molded article 1 would stick to itself when subjected to the nip force between the rollers 3.

After the article has been preheated, it is led through the pressure seal 4 covering the inlet 4' of the prevacuum chamber A. The preheated article is pressed between the pinch rollers 3 in the prevacuum chamber A of subatmospheric pressure. The nip force between the pinch rollers 3 is sufficient to substantially seal the inside of the tubular article and prevent the escape of air therefrom. In the prevacuum chamber the tubular article expands to some extent because the inside thereof is subjected to atmospheric pressure and the outside thereof is subjected to subatmospheric pressure which is controlled by valve 22.

The expanded tubular molded article is transferred along a passage 10 which is nearly equal to the outside diameter of the tubular molded article. The tubular product is heated to its most desirable stretching temperature by means of a thin hot air current disposed around the circumference thereof and directed from the nozzle 11 upwardly to the exhaust opening 8 in a counterdirection with respect to the passage of the article.

The so heated and softened tubular article is introduced into the stretching vacuum chamber B wherein the subatmospheric pressure is lower than the pressure of the prevacuum chamber, said pressure being controlled by means of valve 22'. It will be appreciated that the internal pressure of the tubular article in the stretching vacuum chamber remains at atmospheric pressure, and therefore, the pressure differential between the inside of the article and the outside thereof is greater than said differential is in the prevacuum chamber. Further, the article is in a heated and softened state so that the article readily stretches in a radial or transverse direction to an extent proportional to the pressure differential and elasticity of the so heated article. Because the pressure differential and heat are applied uniformly around the circumference of the article, even and uniform stretching occurs.

Simultaneously, the article is stretched in a longitudinal direction. This is due to the fact that the article is in a heated and softened state, and that the surface velocity of the second stretching pinch rollers 30 is greater than the surface velocity of the first pinch rollers 3. The amount of stretching is proportional to the aforementioned speed differential as well as the state of the thermoplastic resin material of the article.

Now in order to set or fix the thermoplastic article in its permanently stretched condition it is cooled by means of the cool air nozzle 14 which is circular in shape and extends around the circumference and at the top of the passage 15. Locating the cool air nozzle at the top of the passage provides more rapid cooling. As the article passes downwardly through the circular passage 15, it is cooled below its softening temperature by the air current passing concurrently therewith, and the cooled article does not shrink appreciably because it is not heated again. The cool air is exhausted or discharged through the opening 19 at the bottom of the passage 15.

Then the cooled tubular article is introduced into the folding vacuum chamber C where it is folded by means of the rollers 26 which are disposed in pairs at progressively decreasing gaps therebetween until the article reaches the last pair of rollers 26'. The last pair of rollers 26' are positioned relatively close together but are sufficiently far apart to allow the flow of air therebetween. As is best seen in FIG. 3, the tubular article 1, passes between the rollers 26' and thence through the pressure sealer 27" where it hugs the side walls of the opening and allows space for atmospheric air to enter and pass upwardly within the tubular article itself. It will be appreciated that, in this manner, the interior of the article is subjected to a pressure differential with respect to the exterior thereof without the necessity of auxiliary equipment such as pumps, etc. However, under some circumstances, such as when heavy gauge material is employed, or when special material such as tubular vinylidene chloride resin or chlorinated rubber is employed, it may be desirable to subject the interior of the article to a positive pressure while subjecting the exterior thereof to subatmospheric pressure. Thence the article passes from the folding vacuum chamber C to the atmosphere through the discharge opening or slit 27.

Thereafter, the molded tubular article 1 is cut into two sheets by cutter 28, passed through the stretching pinch rollers, and wound into rolls by winding apparatus 32.

The invention in another form thereof comprises heating the tubular article in the passage 10 (FIG. 1) by means of dragging or sliding the article in surface to surface contact with the inside surface of the passage 10. The passage wall is heated by means of passing the heated gas or liquid through the chamber 16''. Further, the tubular article may be cooled in the circular passage 15 by means of dragging or sliding the article in surface to surface contact with the inside surface of the passage wall. The passage wall is cooled by means of passing cool gas or liquid through the chamber 16.

If thermal dimensional stability is necessary, heat setting may be performed as illustrated in FIG. 4. This apparatus is particularly adapted for stretching tubular molded articles of crystal thermoplastic resin.

It is to be noted that corresponding elements in FIGS. 1 and 4 are referred to by the same reference numerals.

Referring to the embodiment of FIG. 4, the vacuum chamber A is enlarged and incorporates the heating rolls 2 so that the article 1 is subjected to a vacuum while being heated. Further this embodiment incorporates a heating or annealing passage 15' disposed between the stretching vacuum chamber B and the cooling passage 15. The heating passage 15' is of round configuration and is of substantially the same diameter as the cooling passage 15. The hot air is discharged from the nozzle 14' which is of an arcuate configuration and extends circumferentially around the article so that a thin film of hot air passes between the outside surface of the article and the inside surface of the heating passage 15'. Thence, the hot air passes downwardly concurrent with the movement of the article until it reaches the exhaust opening 19'. This air is circulated and heated by the steps including passing the air through an exhaust pump 18', through a heater 17', and through a valve leading to the nozzle 14'.

It will be appreciated that the air film is hot enough to anneal the tubular molded article, but is cool enough so that the short chains and chain segments of the molecules of the film are released, and thereby produce an improved molecular orientation in the film.

It will thus be seen that the present invention does indeed provide an improved apparatus and process for stretching tubular articles of thermoplastic resin.

Although particular embodiments of the invention are herein disclosed for purposes of explanation, further modifications thereof after study of this specification, will be apparent to those skilled in the art to which the invention pertains. Reference should accordingly be had to the appended claims in determining the scope of the invention.

What is claimed and described to be secured by Letters Patent is:

1. A process for stretching tubular articles of thermoplastic resin comprising heating a tubular article to a temperature between its softening point and its melting point in a heating zone of subatmospheric pressure, stretching said article in longitudinal and in transverse directions while subjecting the exterior thereof to a subatmospheric pressure, cooling said article to a temperature below the softening point of the resin while subjecting the exterior thereof to a subatmospheric pressure, flattening said article while subjecting the exterior thereof to a subatmospheric pressure, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

2. A process for stretching tubular molded articles of thermoplastic resin comprising heating a continuous tubular molded article to a temperature between its softening point and its melting point in a heating zone of subatmospheric pressure, stretching said article in longitudinal and in transverse directions while subjecting the exterior thereof to subatmospheric pressure, cooling said article to a temperature below the softening point of the resin while subjecting the exterior thereof to a subatmospheric pressure, flattening said article, while subjecting the exterior thereof to a subatmospheric pressure, and longitudinally cutting said article into elongated sheets, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

3. A process for stretching tubular molded articles of thermoplastic resin comprising heating a continuous tubular molded article, pressing said article between a pair of pinch rollers disposed in a prevacuum chamber of subatmospheric pressure, heating said article to a temperature between its softening point and its melting point in a heating zone of subatmospheric pressure, stretching said article simultaneously in longitudinal and in transverse directions while subjecting the exterior thereof to a subatmospheric pressure and subjecting the interior thereof to atmospheric pressure, cooling said article to a temperature below the softening point of the resin while subjecting the exterior thereof to a subatmospheric pressure, flattening said article while subjecting the exterior thereof to a subatmospheric pressure, and longitudinally cutting said article into elongated sheets, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

4. A process for stretching tubular articles of thermoplastic resin comprising heating an elongated tubular article, pressing said article between a pair of pinch rollers disposed in a prevacuum chamber of a first subatmospheric pressure, heating said article between its softening point and its melting point in a heating zone of a second subatmospheric pressure, stretching said article simultaneously in longitudinal and in transverse directions while subjecting the exterior thereof to a third subatmospheric pressure, lower than said second subatmospheric pressure and subjecting the interior of said article to atmospheric pressure, cooling said article to a temperature below the softening point of the resin while subjecting the exterior thereof to a subatmospheric pressure, flattening said article while subjecting the exterior thereof to a subatmospheric pressure, and longitudinally cutting said article into elongated strips.

5. A process for stretching tubular articles of thermoplastic resin comprising pressing said tubular article between a pair of pinch rollers disposed in a prevacuum chamber of subatmospheric pressure, heating said article to a temperature between its softening point and its melting point in a heating zone of subatmoshperic pressure, stretching said article simultaneously in longitudinal and transverse directions while subjecting the exterior thereof to a subatmospheric pressure, cooling said article to a temperature below the softening point of the resin while subjecting the exterior thereof to a subatmospheric pressure, flattening said article while subjecting the exterior thereof to a subatmospheric pressure, longitudinally cutting said article while subjecting the exterior thereof to atmospheric pressure, and winding said article, the tubular substmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

6. A process for stretching tubular molded articles of thermoplastic resin comprising pressing said tubular article between a pair of pinch rollers disposed in a prevacuum chamber of subatmospheric pressure, passing said article through a passage having a substantially circular internal surface, passing a thin layer of heated gas between the inner surface of the passage and the outer surface of the tubular molded article in a direction countercurrent to that of the article, thereby heating said article to a temperature between its softening points and its melting point of the resin while subjecting the exterior thereof to a subatmospheric pressure, stretching said article simultaneously in longitudinal and transverse directions while subjecting the exterior thereof to a subatmospheric pressure, cooling said article to a temperature below the softening point of the resin while subjecting the exterior thereof to a subatmospheric pressure, flattening said article while subjecting the exterior to a subatmospheric pressure, longitudinally cutting said article while subjecting the exterior thereof to atmospheric pressure, and winding said article, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

7. A process for stretching tubular molded articles of thermoplastic resin comprising pressing said tubular article between a pair of pinch rollers disposed in a prevacuum chamber of subatmospheric pressure, heating said article to a temperature between its softening point and its melting point in a heating zone of subatmospheric pressure, stretching said article simultaneously in longitudinal and in transverse directions while subjecting the exterior thereof to a subatmospheric pressure, passing said article through a cooling passage of subatmospheric pressure having a substantially cylindrical configuration, and passing a thin layer of cool air between the inner surface of the cooling passage and the outer surface of the tubular molded article in a direction parallel to the motion of the tubular article, thereby to cool said article to a temperature below the softening point of the resin, flattening said article while subjecting the exterior thereof to subatmospheric pressure, and longitudinally cutting said article, the tubular subatmoshperic external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

8. A process for stretching tubular molded articles of thermoplastic resin comprising pressing said tubular article between a first pair of pinch-rollers disposed in a prevacuum chamber of subatmospheric pressure, passing said article through a cylindrical passage subjected to subatmospheric pressure, passing a thin layer of heated gas in a direction opposite to the motion of the tubular article, thereby to heat said article to a temperature between its softening point and its melting point, longitudinally stretching said article by rotating a second pair of pinch rollers disposed in spaced apart relationship with respect to said first pair of pinch rollers at a surface speed in excess of the surface speed of said first pair of pinch rollers, while simultaneously subjecting the exterior of said molded article to a subatmospheric pressure while the interior thereof remains substantially at atmospheric pressure, passing said article through a cylindrical shaped passage subjected to subatmospheric pressure, passing a thin layer of cooling gas substantially parallel to the direction of movement of said article, thereby to cool said article to a temperature below the softening point of the resin, flattening said article while subjecting the exterior thereof to a subatmospheric pressure, and longitudinally cutting said article into two elongated sheets, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

9. A process for stretching tubular articles of thermoplastic resin comprising heating said tubular article while subjecting the exterior thereof to subatmospheric pressure, pressing said tubular article between a pair of pinch rollers disposed in a prevacuum chamber of substantially the same subatmospheric pressure, heating said article to a temperature between its softening point and its melting point in a heating zone of subatmospheric pressure, stretching said article simultaneously in longitudinal and in transverse directions while subjecting the exterior thereof to a subatmospheric pressure and subjecting the interior thereof to atmospheric pressure, annealing said tubular molded article to the temperature between its softening point and melting point in a heat setting zone of subatmospheric pressure, cooling said article to a temperature below the softening point of the resin while subjecting the exterior thereof to a subatmospheric pressure and the interior thereof to atmospheric pressure, flattening said article while subjecting the exterior thereof to subatmospheric pressure, and longitudinally cutting said article, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

10. A process for stretching tubular articles of thermoplastic resin comprising passing said tubular article between a pair of pinch rollers disposed in a prevacuum chamber of subatmospheric pressure, sliding the exterior surface of said article on the interior surface of a cylindrical heating chamber, thereby to heat said article to a temperature between its softening point and its melting point while subjecting the exterior thereof to a subatmospheric pressure, stretching said article simultaneously in longitudinal and in transverse directions while subjecting the exterior thereof to a subatmospheric pressure and the interior thereof to atmospheric pressure, sliding the exterior surface of said article on the interior surface of a cylindrical cooling chamber to cool said article to a temperature below the softening point thereof while subjecting the exterior of the article to a subatmospheric pressure and subjecting the interior thereof to atmospheric pressure, flattening said article while subjecting the exterior thereof to a subatmospheric pressure, and longitudinally cutting said article into elongated strips, the tubular subatmospheric external pressure during heating, stretching, cooling, and flattening being of different magnitudes, respectively, and the tubular external pressure being of lower magnitude than the internal pressure during heating, stretching, cooling, and flattening, respectively, and the pressure differential between the external pressure and the internal pressure being of different magnitudes respectively during heating, stretching, cooling and flattening.

11. Apparatus for stretching a tubular article of thermoplastic resin comprising a first pair of pinch rollers disposed in a prevacuum chamber, a stretching vacuum chamber, heating means for said article disposed in interconnecting means between said pre-vacuum chamber and said stretching vacuum chamber, a folding vacuum chamber, cooling means for said article disposed in interconnecting means between said stretching vacuum chamber and said folding vacuum chamber means for folding said article into a flat shape disposed in said folding vacuum chamber, cutting means for longitudinally cutting said article, a second pair of pinch rollers disposed adjacent said cutting means and operable at a surface speed in excess of the surface speed of said first pair of pinch rollers, and means for winding said article.

12. Apparatus for stretching a tubular article of thermoplastic resin comprising a first pair of pinch rollers disposed in a prevacuum chamber, a stretching vacuum chamber, a heated passage inter-connecting said prevacuum chamber and said stretching vacuum chamber, said heated passage having a lower inlet and an upper outlet for the passage of a thin ring-like layer of heated gas, means for subjecting the interior of said stretching vacuum chamber to subatmospheric pressure, means for subjecting the interior of said tubular article when passing through said stretching vacuum chamber to atmospheric pressure, a folding vacuum chamber, cooling means for said article disposed in interconnecting means between said stretching vacuum chamber and said folding vacuum chamber, means for folding said article into a flat shape disposed in said folding vacuum chamber, cutting means for longitudinally cutting said article, a second pair of pinch rollers disposed adjacent said cutting means and operable at a surface speed in excess of the surface speed of said first pair of pinch rollers, and means for winding said article.

13. Apparatus for stretching a tubular article of thermoplastic resin comprising a plurality of preheating rollers for preheating said tubular article, a first pair of pinch rollers disposed in a prevacuum chamber, a stretching vacuum chamber, heating means for said article disposed in interconnecting means between said pre-vacuum chamber and said stretching vacuum chamber, a folding vacuum chamber, cooling means for said article disposed in interconnecting means between said stretching vacuum chamber, and said folding vacuum chamber, means for folding said article into a flat shape disposed in said folding vacuum chamber, a second pair of pinch rollers disposed adjacent said folding vacuum chamber operable at a surface speed in excess of the surface speed of said first pair of pinch rollers.

14. Apparatus for stretching a tubular article of thermoplastic resin comprising a prevacuum chamber, a plurality of preheat rollers disposed in said prevacuum chamber and adapted to receive said tubular article to heat said article to a temperature near the softening temperature but less than the self-sticking temperature of the resin, a first pair of pinch rollers disposed in said prevacuum chamber, a stretching vacuum chamber, a passage interconnecting said stretching vacuum chamber and said prevacuum chamber, heating means for said article disposed in said passage, a folding vacuum chamber, a second passage interconnecting said stretching vacuum chamber and said folding vacuum chamber, cooling means for said second passage, means for folding said article into a flat sheet disposed in said folding vacuum chamber, a second pair of pinch rollers disposed adjacent said folding vacuum chamber and operable at a surface speed in excess of the surface speed of said first pair of pinch rollers.

15. Apparatus for stretching a tubular article of thermoplastic resin comprising a first pair of pinch rollers disposed in a prevacuum chamber, a stretching vacuum chamber, a heated passage interconnecting said prevacuum chamber and said stretching vacuum chamber, a folding vacuum chamber, a second passage interconnecting said stretching vacuum chamber and said folding vacuum chamber, an upper inlet and a lower outlet for the passage of cooling gas through said second passage to cool said article to a temperature below the softening point of the resin, means for folding said article into a flat shape disposed in said folding vacuum chamber, cutting means for longitudinally cutting said article, a second pair of pinch rollers disposed adjacent said cutting means and operable at a surface speed in excess of the surface speed of said first pair of pinch rollers, and means for winding said article.

16. Apparatus for stretching a tubular article of thermoplastic resin comprising a prevacuum chamber subjected to a controlled subatmospheric pressure, a first pair of pinch rollers disposed in said chamber, a stretching vacuum chamber, means for controlling the subatmospheric pressure in said stretching vacuum chamber, a heated passage interconnecting said prevacuum chamber and said stretching vacuum chamber, means for subjecting the interior of said stretching vacuum chamber to subatmospheric pressure and means for subjecting the interior of said article when passing through said chamber to atmospheric pressure, a folding vacuum chamber, a cooling passage interconnecting said stretching vacuum chamber and said folding vacuum chamber, means for controlling the subatmospheric pressure in said folding vacuum chamber, a plurality of pairs of guide rollers disposed in a downwardly tapered array for gradually bringing opposite sidewalls of said tubular article towards each other forming a substantially flat sheet, cutting means disposed outwardly of said folding vacuum chamber for longitudinally slitting said article, a second pair of pinch rollers disposed adjacent said cutting means and operable at a surface speed in excess of the surface speed of said first pair of pinch rollers.

17. Apparatus for stretching a tubular article of thermoplastic resin comprising a first pair of pinch rollers disposed in a prevacuum chamber, a stretching vacuum chamber, a heating passage interconnecting said prevacuum chamber and said stretching vacuum chamber, means for subjecting the interior of said stretching vacuum chamber to subatmospheric pressure, and means for subjecting the interior of said article when passing through said chamber to atmospheric pressure, a second heating passage for annealing said tubular molded article to a temperature between the softening point and the melting point of said thermoplastic resin, a folding vacuum chamber, a cooling passage interconnecting said second heating passage and said folding vacuum chamber, means for folding said article into a flat shape disposed in said folding vacuum chamber, cutting means for longitudinally slitting said article, a second pair of pinch rollers disposed adjacent said cutting means and operable at a surface speed in excess of the surface speed of said first pair of pinch rollers.

18. Apparatus for stretching a tubular article of thermoplastic resin comprising a first pair of pinch rollers disposed in a prevacuum chamber, a stretching vacuum chamber, means for controlling the subatmospheric pressure in said stretching vacuum chamber, a first passage interconnecting said prevacuum chamber and said stretching vacuum chamber, means for heating the inside surface of said first passage, said article being slidably engageable with said inside surface, means for subjecting the interior of said vacuum chamber to subatmospheric pressure, means for subjecting the interior of said article when passing through said chamber to atmospheric pressure, a folding vacuum chamber, means for controlling the subatmospheric pressure in said folding vacuum chamber, a second substantially cylindrical passage, means for cooling the interior surface of said second passage, the exterior surface of said article being slidably engageable with the interior surface of said second passage to cool said article to a temperature below the softening point, means for folding said article into a flat shape disposed in said folding vacuum chamber, cutting means for longitudinally cutting said article, a second pair of pinch rollers disposed adjacent said cutting means and operable at a surface speed in excess of the surface speed of said first pair of pinch rollers.

19. Apparatus for stretching a tubular article of thermoplastic resin comprising a prevacuum chamber, valve means for controlling the subatmospheric pressure in said prevacuum chamber, sealing means for sealing the inlet to said prevacuum chamber, a plurality of heating rollers disposed in said prevacuum chamber for heating said tubular article, a first pair of pinch rollers disposed in said prevacuum chamber, a stretching vacuum chamber, having subatmospheric pressure, a first passage interconnecting said prevacuum chamber and said stretching vacuum chamber, said first passage having a lower inlet and an upper outlet for the circulation of a thin film of upwardly flowing heated gas, said gas being adapted to pass between the inside surface of said first passage and the outside surface of said article when said article is passing therethrough, means for heating and circulating said gas comprising an exhaust pump, a gas heater, a valve, and interconnecting piping means; means for controlling the subatmospheric pressure in said stretching vacuum chamber, means for subejcting the interior of said article when passing through said chamber to atmospheric pressure, a folding vacuum chamber, a substantially cylindrical cooling passage interconnecting said stretching vacuum chamber and said folding vacuum chamber, said cooling passage having an upper inlet and a lower outlet for the passage of a thin film of cool air between the interior surface of said passage and the exterior surface of said article when said article is passing through said passage, means for circulating and cooling said film of air comprising an exhaust pump, a cooler, a valve, and interconnecting piping; means for controlling the pressure in said folding vacuum chamber, a plurality of pairs of guide rollers disposed in downwardly decreasing spaced relationship to fold said article into a substantially flattened shape, a lower outlet for said folding vacuum chamber, sealing means for the outlet of said folding vacuum chamber, a cutter disposed adjacent said outlet for cutting said article into strips, a pair of opening rollers disposed adjacent said cutter, a second pair of pinch rollers disposed adjacent said opening rollers and operable at a surface speed in excess of the surface speed of said first pair of pinch rollers, additional pinch rollers for said strips, and means for winding each of said strips.

References Cited

UNITED STATES PATENTS

| 2,337,927 | 12/1943 | Riechel et al. | 18—14 |
| 2,688,773 | 9/1954 | McIntire | 264—95 |
| 2,955,318 | 10/1960 | Cook et al. | 264—95 X |
| 3,167,814 | 2/1965 | Corbett | 264—95 X |
| 3,235,632 | 2/1966 | Lemmer et al. | 264—95 X |

FOREIGN PATENTS

| 924,501 | 4/1963 | Great Britain. |

ROBERT F. WHITE, *Primary Examiner.*

A. R. NOE, *Assistant Examiner.*